United States Patent Office 2,999,852
Patented Sept. 12, 1961

2,999,852
METHOD OF PREVENTING POLYMERIC PYRROL-IDONES AND PIPERIDONES FROM ADHERING TO POLYMERIZATION VESSELS IN WHICH THEY ARE PREPARED
Edgar E. Renfrew, Lock Haven, and Saul R. Buc, Easton, Pa., assignors to General Aniline & Film Corporation, New York, N.Y., a corporation of Delaware
No Drawing. Filed Dec. 4, 1958, Ser. No. 778,049
6 Claims. (Cl. 260—78)

This invention relates to a novel coating method to provide improved surfaces for equipment used in the polymerization of monomeric pyrrolidone and piperidone so as to prevent the resulting polymers from adhering to said surfaces.

The polymerization of 2-pyrrolidone, 2-piperidone, and the like to yield novel and useful products is well known. The methods currently employed are described in U.S. Patents 2,638,463; 2,739,959; 2,806,841 and 2,809,958, the teachings of which are incorporated herein for details regarding the polymerization technique and equipment employed.

In the processes described in these patents, there exists a very serious drawback in that the polymers during the early stages of formation have the tendency to stick to the surfaces of the equipment used. The liquid monomers, such as 2-pyrrolidone, etc., containing a catalytic material, i.e. potassio- or sodio-pyrrolidone and the like and in the presence of other materials capable of initiating the polymerization reaction can be polymerized to high melting solid materials, either in the presence or absence of unreacted suspending materials, such as the liquid alkanes. During the transition from liquid to solid, the 2-pyrrolidone or 2-piperidone derived material goes through a viscous stage during which time it becomes coherent and also adherent to most other materials, such as glass, steel, ceramic surfaces and the like. When the reaction goes on further a horny solid adhering tenaciously to the wall results.

It is the principal object of the present invention to provide a novel coating for equipment employed in the polymerization of pyrrolidone, piperidone and the like during the polymerization reaction without the resulting polymer adhering to the surfaces of the equipment.

Other objects and advantages will become more clearly manifest from the following description.

We have discovered that by conditioning glass, ceramic, steel, stainless steel and other metallic and non-metallic surfaces commonly employed in the construction of equipment vessels for commercial polymerization operations with certain species of alkyltrichlorosilane, surfaces are obtained which are essentially non-sticking during the polymerization of 2-pyrrolidone, 2-piperidone and the like.

The procedure by which these surfaces are prepared is first to clean the surface, especially after the non-related chemical reaction was conducted, with either sulfuric acid followed by a soaking in caustic soda solution of sufficient concentration to neutralize the acid, or by the usual cleansing agents, such as soap, water, detergents and the like, and after rinsing with plain tap water and drying, to wet the clean and dry surface with a solution of 1 part by weight of an alkyltrichlorosilane containing from 10 to 18 carbon atoms in 100–200 parts by weight of a suitable solvent. Such solvents include aromatic hydrocarbons, ketones, nitriles, esters, aliphatic hydrocarbons and ethers, preferably with a boiling point below 180° C., preferably from 80° to 160° C. at atmospheric pressure, to facilitate drying. Examples include acetone, toluene, heptane, ethyl acetate, diethyl ether, and acetonitrile. The wetted surfaces are then permitted to dry at room or elevated temperature ranging from 30° to 100° C. After normal or special drying, the surfaces are then treated with ordinary water, moist air or steam followed by a rinsing with water and allowed to dry again at room temperature. Surfaces conditioned in this manner are wetted very poorly by water. The polymerizing 2-pyrrolidone, 2-piperidone and the like does not adhere to the conditoned surface and as a consequence considerable improvement in the ease of handling over presently employed equipment is obtained.

Despite the fact that the surface coatings are semi-durable, they can however, be effectively removed by soaking in hot aqueous alkaline solutions.

The alkyltrichlorosilanes employed in accordance with the present invention are well known compounds and are characterized by the following general formula: $RSiCl_3$, wherein R represents an alkyl group of from 10 to 24 carbon atoms. Illustrative of the species of the alkyltrichlorosilanes which fall within the ambit of this formula, the following may be mentioned:

Decyltrichlorosilane
Hendecyltrichlorosilane
Dodecyltrichlorosilane
Tridecyltrichlorosilane
Cetyltrichlorosilane
Octadecyltrichlorosilane
Eicosyltrichlorosilane
Tetracosyltrichlorosilane Further examples of aliphatic and aromatic liquid hydrocarbons of the benzene series which are employed as solvents for the foregoing alkyltrichlorosilanes are as follows:

| | |
|---|---|
| Heptane | Benzene |
| 2-methyl hexane | Toluene |
| 3-methylhexane | o-Xylene |
| 2,2-dimethyl pentane | m-Xylene |
| 3,3-dimethyl pentane | p-Xylene |
| 2,4-dimethyl pentane | Ethylbenzene |
| Ethyl pentane | Propylbenzene |
| Octane | Isopropylbenzene |
| 2-methyl heptane | 1,2-ethylmethylbenzene |
| 2-5-dimethyl hexane | 1,3-ethylmethylbenzene |
| Nonane | |

Following the treatment of the surfaces of the equipment to be used for the polymerization regardless of whether the equipment is fabricated from glass, ceramic, steel or other metallic and non-metallic surfaces, we have found that following the drying period the reaction vessel fabricated from said materials may be filled with water containing 1% by weight of a non-ionic surfactant of the alkyl phenol-ethylene oxide type and the aqueous surfactant solution stirred for a period of time ranging from ½ to 1½ hours. Thereafter the vessel is emptied, rinsed well with tap water and then dried either at room temperature or at elevated temperature ranging from 80° to 100° C. Although this treatment is highly desirable, treatment with moist air or steam may be preferable where such facilities are available.

The following examples will illustrate the coating method to provide improved surfaces of the equipment used in the polymerization of pyrrolidone, piperidone and the like. All parts are by volume except where otherwise noted.

*Example 1*

A glass vessel equipped for vacuum distillation and mechanical stirring was conditioned by soaking in sodium hydroxide solution (10% for 1 hour at 80° C.). The vessel was well rinsed with water and again dried at 80° C. To the dried vessel was then added a solution made up of 1 part of dodecyltrichlorosilane in a mixture consisting of 40 parts of xylene and 160 parts of benzene. Enough of the solution was used so that all internal surfaces of the vessel were wetted by splashing or otherwise bringing the liquid in contact with the surfaces. The surfaces were then drained and dried at 80° C. for 1 hour. After drying, the vessel was then filled with water containing 1% by weight of an non-ionic surfactant obtained by condensing 1 mole of nonylphenol with 15 moles of ethylene oxide followed by stirring for a period of one hour. The vessel was emptied and rinsed well with tap water. The characteristic behavior observed of the water on the surfaces was that it wetted it badly, standing in globules which roll freely on the walls. The vessel after drying at 80° C. for 1 hour is in condition for the polymerization of pyrrolidone without serious adherence of the polymerizing material to the walls regardless of the method or conditions of polymerization used, including even very slow polymerization rates.

*Example II*

Example I was repeated with the exception that the dodecyltrichlorosilane was replaced by an equivalent amount of octadecyltrichlorosilane. After conditioning and drying, the vessel was employed for the polymerization of pyrrolidone and it was observed that the polymerizing pyrrolidone did not adhere to the surface at any stage during the polymerization reaction including the completion thereof.

*Example III*

The interior of a clean dry steel vessel equipped for vacuum distillation and mechanical stirring was wetted with a solution of 1 part of decyltrichlorosilane in 100 parts of xylene. After draining the steel vessel was dried at 80° C., and then treated with steam followed by rinsing with water and drying at room temperature. The resulting coated surface was not receptive to the amorphous bodies formed early in the polymerization of pyrrolidone. A similar untreated steel vessel used for this polymerization was left coated with a layer of tightly adhering polymer.

*Example IV*

Example III was repeated except that the treating solution was 10 parts of dodecyltrichlorosilane in 100 parts of acetone. After draining, the vessel was immediately filled with water which was stirred for 1 hour. After emptying the vessel and drying it at 80° C., it was used for the polymerization of pyrrolidone. The polymer did not adhere to the treated surfaces.

*Example V*

Example III was repeated with the exception that the decyltrichlorosilane was replaced by an equivalent amount of cetyltrichlorosilane.

*Example VI*

A vitreous vessel equipped for vacuum distillation and mechanical stirring was coated by the method of Example I with the exception that the dodecyltrichlorosilane was replaced by an equivalent amount of hendecyltrichlorosilane. The vitreous vessel was then filled with water containing 1% by weight of a non-ionic surfactant obtained by the condensation of 1 mole of dinonylphenol with 10 moles of ethylene oxide, followed by stirring for a period of 1 hour. Thereafter, the aqueous surfactant was emptied and the vessel rinsed well and dried at 80° C. The vessel was then used in the polymerization of piperidone and at no stage of the polymerization, including the final stage, was there any evidence of the polymer adhering to the vessel.

In connection with the alkyltrichlorosilanes employed in accordance with the present invention, it is interesting to note that lower alkyldichlorosilanes, such as diethyl and dipropyldichlorosilanes, as well as methyl-, butyl- and heptyltrichlorosilanes, including a commercial material obtained on the open market under the brand name of "Siliclad" purported to be a water soluble silicone concentrate, did not yield anti-sticking properties to glass, steel and ceramic reaction vessels when employed in a concentration of 1 part by weight per 100–200 parts by weight of the aforementioned solvents.

By the term "aqueous fluid" as employed in the appended claims we include only the treatment of the dry surface, following the wetting with an alkyltrichlorosilane, with water, moist air or steam.

While all of the foregoing illustrative examples show the treatment of polymerization vessels equipped for vacuum distillation, it is to be noted that the practice of the present invention is also applicable to any type of polymerization vessel whether it is or is not equipped for vacuum distillation. For example the monomeric pyrrolidone or piperidone together with the corresponding potassium derivative thereof may be prepared separately in another flask or vessel and then transferred to a previously treated vessel, such as a glass or stainless steel beaker and the polymerization conducted therein. The polymerization will run smoothly without adherence of the polymer to the sides of such treated vessel.

We claim:

1. The method of preventing polymeric pyrrolidones and piperidones from adhering to polymerization equipment in which they are prepared comprising cleaning the interior surfaces of said equipment and drying said interior surfaces, wetting the cleaned and dried interior surfaces of said equipment, prior to polymerization, with a solution containing 0.5 to 10 parts by weight of an alkyltrichlorosilane of 10 to 24 carbon atoms, followed by exposing the treated surface to an aqueous fluid containing 1% by weight of a non-ionic alkyl phenol-ethylene oxide surfactant and drying the same and thereafter polymerizing the corresponding monomers of said pyrrolidones and piperidones in the dried equipment and recovering the polymer therefrom.

2. The method according to claim 1 wherein the alkyltrichlorosilane is decyltrichlorosilane.

3. The method according to claim 1 wherein the alkyltrichlorosilane is octadecyltrichlorosilane.

4. The method according to claim 1 wherein the alkyltrichlorosilane is cetyltrichlorosilane.

5. The method according to claim 1 wherein the alkyltrichlorosilane is hendecyltrichlorosilane.

6. The method according to claim 1 wherein the alkyltrichlorosilane is dodecyltrichlorosilane.

References Cited in the file of this patent

UNITED STATES PATENTS

| | | |
|---|---|---|
| 2,439,689 | Hyde | Apr. 13, 1948 |
| 2,483,283 | Polak | Oct. 4, 1949 |
| 2,729,538 | Hull | Jan. 3, 1956 |
| 2,811,408 | Braley | Oct. 28, 1957 |